United States Patent [19]

Mehaffey

[11] 4,310,725

[45] Jan. 12, 1982

[54] INTERFACE FOR PRIVATE BRANCH EXCHANGE

[75] Inventor: Joseph H. Mehaffey, Atlanta, Ga.

[73] Assignee: Solid State Systems, Inc., Marietta, Ga.

[21] Appl. No.: 112,725

[22] Filed: Jan. 17, 1980

[51] Int. Cl.³ .......................... H04M 7/14; H04Q 3/62
[52] U.S. Cl. .......................... 179/18 AH; 179/18 AD
[58] Field of Search ........ 179/18 AH, 18 FA, 99 LC, 179/18 AD

[56] References Cited

U.S. PATENT DOCUMENTS

| | | | |
|---|---|---|---|
| 3,940,570 | 2/1976 | Goudikian | 179/18 AH |
| 4,002,850 | 1/1977 | Richards et al. | 179/18 AH |
| 4,110,565 | 8/1978 | Gaetano | 179/18 AH |
| 4,190,745 | 2/1980 | Jusinskas, Jr. et al. | 179/18 AH |
| 4,221,936 | 9/1980 | Vaughan | 179/18 AD |

OTHER PUBLICATIONS

"Remreed Line Scanner", by J. C. Kennedy et al., *Bell System Technical Journal*, vol. 55, No. 5, pp. 597–606, May–June 1976.

*Primary Examiner*—Thomas W. Brown
*Attorney, Agent, or Firm*—Jones, Thomas & Askew

[57] ABSTRACT

An interface for connecting a PBX line (18) to a central office trunk (15) and for providing a supervisory signal (28) and accepting PBX hook switch and dial pulse inputs (30), being readily adaptable to ground start trunks and loop start trunks. A pair of transistor switches (55, 56) sharing a common base drive (57) is biased by a differential bias means (59, 60, 61) to operate a ground start isolated switch (32, 35) and an isolated loop closing switch (36, 37). The supervisory signal is controlled by a comparator (45) which senses grounding of central office tip (16) to establish the supervisory signal and is subsequently responsive only to the presence of current in the central office loop detected by a relay (65) buried in a coupling transformer.

7 Claims, 1 Drawing Figure

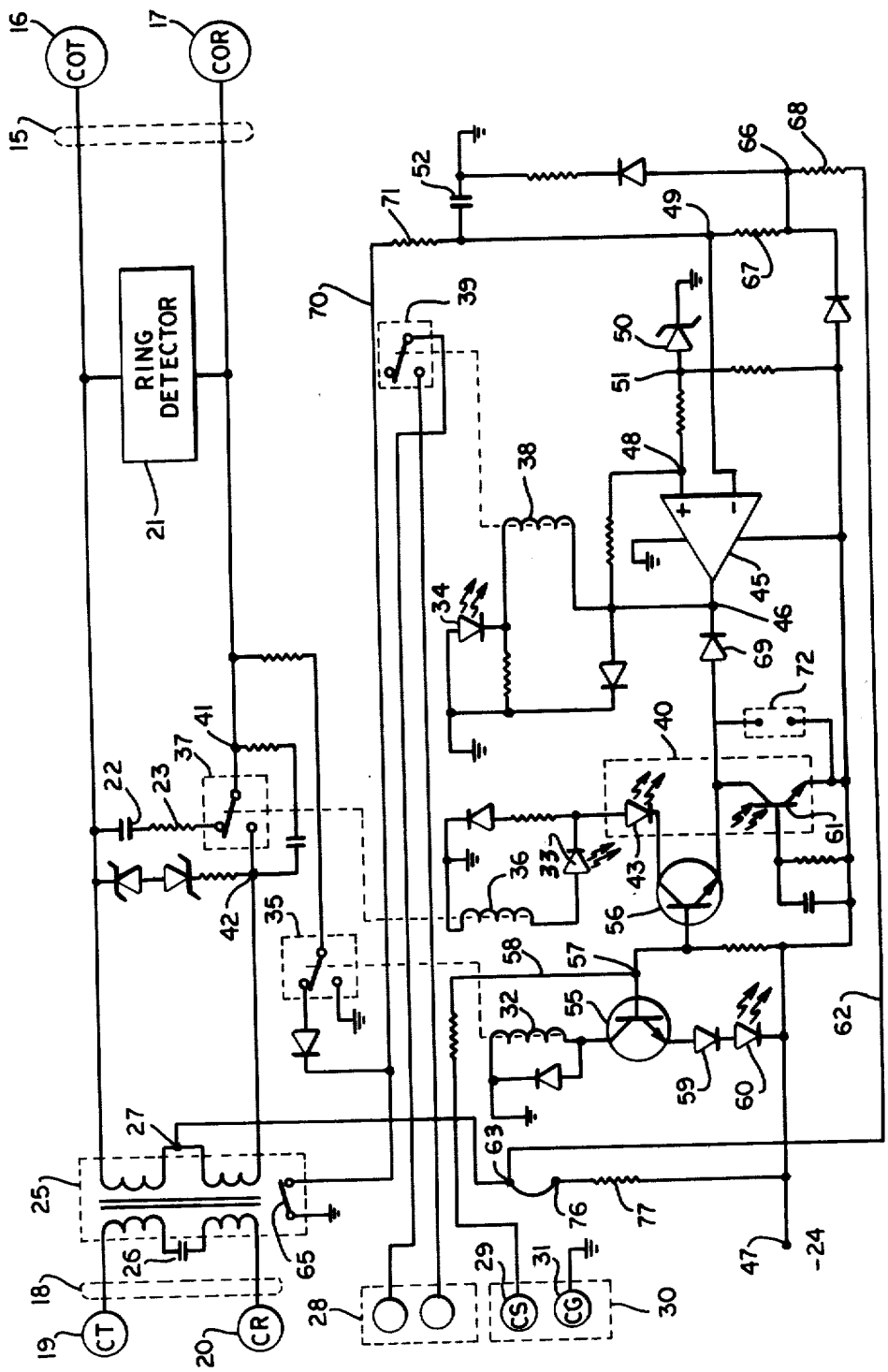

INTERFACE FOR PRIVATE BRANCH EXCHANGE

TECHNICAL FIELD

The present invention relates to telephony and more particularly to private branch exchange (PBX) telephony and devices for interfacing central office trunks to private branch exchange equipment.

BACKGROUND OF THE INVENTION

Since its invention over one hundred years ago the telephone has become one of the major vehicles for communication in the modern world. From an early point in the telephone's development, it became apparent that any large organization such as a business requiring a large number of telephones could advantageously provide a central switchboard that could direct incoming calls to a proper telephone line within the business. This avoids the necessity for having an individual dedicated line from a telephone company central office going to each telephone station within the organization. Such an arrangement has commonly been known as a private branch exchange (PBX).

In more recent times, both the call distribution functions and the seizure of central office telephone lines for outgoing calls have become automated or semiautomated. Whether automated or not, it is necessary in a private branch exchange to interface a number of trunk lines from a central telephone company office to a number of telephone lines within the PBX.

More recently, a confluence of legal and technical developments has made it highly desirable to provide a simple, inexpensive, versatile piece of apparatus for interfacing central office trunk lines with private branch exchange lines. Legal developments in the United States have been characterized by tendency to limit telephone utility monopolies to central office equipment and lines emanating therefrom. Regulating bodies, principally the FCC, have concluded that so long as PBX equipment is adequately designed so as not to damage telephone company central office equipment there is no rationale for preventing competition in the private branch exchange market. This development has naturally spawned a great deal of technical development and a proliferation of different types of private branch exchange equipment.

Modern private branch exchange interfaces conventionally provide four terminal pairs on the PBX side of the equipment for each central office trunk. These pairs are used for the audio signal path (customer tip and customer ring); a pair used for signal detection of a ring signal on the central office trunk, a pair for providing a supervisory signal indicating seizure of the central office trunk, and a pair for acceptance of status of a hook switch associated with the PBX line currently connected to the interface.

As is known to those skilled in the art, different telephone companies' central offices will respond to different signals provided by a customer on the central office trunk in order to effect seizure of a central office trunk line or to trip the ring. On central offices with ground start trunks, an outgoing call from the PBX to the central office is signaled by grounding a particular lead of the central office trunk, conventionally the central office ring conductor.

Other types of telephone central offices have loop start trunks which will respond to seize the central office line when closure of a current path between central office tip and central office ring is effected.

It is therefore advantageous to provide an interface between a central office trunk line and a generalized set of private branch exchange terminal pairs which is inexpensive, reliable, may be used with loop start and ground start central office equipment, and which allows a designer of the PBX to be faced with a minimum number of specifications for the equipment to be connected to the PBX terminal pairs.

Heretofore, interface devices for interfacing central office trunks and private branch exchange lines have been complex, relatively expensive, and have required a large number of different parts in order to accommodate both ground start trunks and loop start trunks.

SUMMARY OF THE INVENTION

The present invention provides an interface between a central office trunk and a plurality of terminal pairs for a private branch exchange which will provide control signals from the PBX to the central office, accept control signals from the central office, and may be easily and cheaply adapted between ground start and loop start central offices.

The present invention provides all of the foregoing features of a private branch exchange interface at a minimum cost using a small number of components.

Basically the present invention may advantageously provide the control between the central office and the private branch exchange by providing a supervisory signal, at a supervisory terminal pair for the PBX, which is initially responsive to a control signal from the central office but which after seizure of the central office trunk is responsive only to the presence or absence of loop current in the central office loop.

Stated somewhat more specifically, when the present invention is connected for use with ground start central office equipment, a simple control arrangement is provided that responds to an off-hook signal at a PBX hook switch terminal pair and an absence of a signal at a supervisory terminal pair (indicating the central office trunk is unseized) to initiate a ground start sequence. The control for this sequence is effected in a very simple manner by a pair of switches having a differential bias arrangement associated with each of the switches being responsive to the PBX hook switch pair. Upon an indication of the off-hook signal as described above, the first switch operates an isolated switch such as a relay or optocoupler to ground the central office ring lead. An acknowledgement of seizure from the central office grounds the central office tip, which causes the present invention to provide the supervisory signal at the PBX supervisory terminal pair.

The present invention provides a novel means of connecting a comparator responsive to the presence of the supervisory signal as part of the differential bias for the pair of switches referred to above, so that establishment of the supervisory signal indicating seizure of the central office trunk causes the differential bias arrangement to turn off the isolated switch which grounded the central office ring and to turn on an isolated switch which closes the central office loop.

The present invention also provides a latching means for maintaining closure of a central office loop so long as the supervisory signal remains present.

Another novel feature of the present invention is the unique combination of a switch responsive to the presence of loop current in the central office loop which will maintain or establish a supervisory signal at the PBX supervisor terminal pair. This unique arrangement allows the supervisory signal to be established either in response to a central office control signal or in response to the establishement of loop current in the central office loop (for a loop start trunk).

The present invention further provides a means whereby the simple shorting of one terminal pair of an isolated switch (such as relay contacts or the switching transistor side of an optocoupler) will cause the isolated switch which grounds the central office ring to be unresponsive to an off-hook condition on the PBX hook switch terminal pair, and will cause the isolated switch which closes the central office loop to close immediately upon establishement of the off-hook condition.

The novel and inexpensive arrangement of the present invention may be appreciated from the detailed description of the preferred embodiment to follow.

BRIEF DESCRIPTION OF THE DRAWING

The drawing FIGURE herewith is a schematic diagram of the preferred embodiment of the present invention.

DETAILED DESCRIPTION

Turning now to the FIGURE, the preferred embodiment of the present invention will now be described. Central office trunk 15 comprises a central office tip conductor 16, a central office ring conductor 17. The tip-ring pair 18 on the PBX side of the interface comprises a customer tip terminal 19 and a customer ring terminal 20. Across central office trunk 15 is connected a ring detector 21 shown as a block diagram in the FIGURE. It will be understood that ring detector 21 provides a signal to another terminal pair (not shown) on the PBX side of the interface which signals to the customer equipment that a ringing signal is present between central office tip 16 and central office ring 17.

A capacitor 22 blocks DC loop current in the central office trunk but will pass an alternating current signal in conjunction with resistor 23. These components are used to provide an A.C. load to prevent oscillation (or "singing") when the line is idle. The PBX tip-ring pair 18 is coupled to central office trunk 15 through transformer 25. As may be seen from the drawing, the secondary (PBX side) of tranformer 25 has a capacitor 26 connected in series therewith and therefore will not pass a steady state direct current in response to a DC voltage impressed between points 19 and 20. The primary transformer 25 (central office side) is center tapped at point 27.

A pair of terminals 28 provided to the PBX equipment serves as the supervisory terminals. As will become apparent from the description hereinbelow, a short circuit provided across these terminals will be referred to as a supervisory signal which is indicative of central office supervision on trunk 15.

Another terminal pair 30 consists of CS terminal 29 and customer ground (CG) terminal 31. It will be appreciated by those skilled in the art that closure across terminal pair 30 corresponds to an off-hook signal condition on a particular line from the PBX which is connected to customer tip-ring pair 18.

Input provided by the PBX equipment to terminal pair 30 corresponds to the input from the hook switch of a telephone unit and thus on-hook, off-hook, and dial pulse signals (for PBX equipment using dial pulses rather than tone control dialing) all will be impressed across terminal pair 30 in a conventional manner. For tone dialing central offices, dual tone signals should be applied between point 19 and 20.

It will also be appreciated that the PBX equipment attached to the interface may appropriately respond to the presence or absence of the closure across terminal pair 28 in a manner to be determined by the designer of PBX equipment. Some simple, straightforward constraints must be followed in order to have the PBX equipment properly respond to the true status of trunk 15.

The structure of the preferred embodiment also includes four isolated switches and a comparator. As used herein, the term isolated switch generally refers to relays, optocouplers and similar two port devices in which the provision of a current to one port affects the impedance seen looking into the other port.

One isolated switch of the preferred embodiment is the ground start relay comprising coil 32 and contacts 35. The relay comprising coil 36 and contacts 37 is referred to as the loop relay, because its function is to close the loop between tip 16 and ring 17 by connecting point 41 to point 42 through contacts 37 upon energization of coil 36.

It will be understood by those skilled in the state of the art that in a second preferred version of this invention, the slight imbalance introduced by having relays 35 and 36 breaking the ring side of the line can be eliminated by breaking the transformer center tap at 27 and inserting the relay circuitry. This will provide essentially complete balance to ground in the idle state as well as the operating state.

The relay comprising coil 38 and contacts 39 is referred to as the supervisory relay and, as may be seen from the drawing, effects closure across terminal pair 28 upon the excitation of coil 38. In the drawing all relays are shown in their normal position with their respective coils unexcited. Photodiode 34 is forward biased, and thus illuminated, when coil 38 is excited. Therefore photodiode 34 provides a visual indication that the supervisory relay is closed.

Optocoupler 40 comprises another isolated switch of the present invention.

Comparator 45 provides an output to point 46 and serves as the driver for the coil 38 of the supervisor relay. In the preferred embodiment of the present invention, comparator 45 is embodied by a type LM 311 comparator but of course other suitable comparators may be used.

SUPERVISORY CONTROL

One of the novel features of the present invention is the unique and simple manner in which a supervisory signal is provided at terminal pair 28 to the PBX equipment. As noted hereinabove, a short circuit across terminal pair 28 is indicative of a closure of contacts 39 in response to excitation of coil 38 of the supervisory relay. As is further noted and may be seen from the drawing, coil 38 is controlled by the voltage at point 46. The negative power supply of comparator 45 is connected to −24 volts, indicated at point 47 with the positive power supply being tied to ground. Therefore when comparator 45 has a positive output, point 46 will be approximately at ground potential thus preventing excitation of coil 38 and when comparator 45 has a negative output, point 46 will be at approximately −24 volts.

Comparator 45 compares the voltage between point 48 at its noninverting input and point 49 at its inverting input. The voltage of point 48 is dominated by the effect of zener diode 50, which sets the voltage at point 51. In the preferred embodiment, the zener voltage of diode 50 is 12 volts and therefore point 51 will be maintained at −12 volts. As may be seen from the drawing, point 49 is electrically identical to the ungrounded side of capacitor 52. It will therefore be appreciated that the voltage point 49 is controlled by capacitor 52 and the resistors through which this capacitor charges and discharges, as will be described hereinbelow. Therefore when point 49 is more negative than −12 volts, point 46 will be approximately −24 volts and when point 49 is more positive than −12 volts, point 46 will be at approximately ground potential cutting off coil 38.

Transistors 55 and 56 control the current through coils 32 and 36, respectively. Transistors 55 and 56 have their bases tied to a common point 57 which is connected through line 58 to terminal 29 of the PBX hook switch terminal pair 30. Therefore, transistors 55 and 56 have a common source of base drive from line 58. The emitter of transistor 55 is connected to the −24 volt power supply through diode 59 and light-emitting diode 60. As will be appreciated by those skilled in the art, when diodes 59 and 60 are forwarded biased and the base-emitter junction of transistor 55 is forward biased, point 57 will be almost three volts more positive than the −24 volt power supply.

The emitter of transistor 56 is connected to the minus twenty-four volt supply through the phototransistor 61 of optocoupler 40. Therefore, when the base-emitter junction of transistor 56 is forward biased and phototransistor 61 is saturated, the base of transistor 56 will be maintained approximately 1.2 volts above the −24 volt power supply.

The two foregoing descriptions of the voltages at the bases of transistors 55 and 56 are inconsistent, and it will be apparent that both conditions cannot prevail at the same time. Therefore, when transistor 56 becomes saturated, it will "steal" all of the current from point 57 due to the voltage drop across diodes 59 and 60 and deprive transistor 55 of base drive, thus cutting this transistor off. It will therefore be appreciated that the combination of diodes 59 and 60, together with the common connection to the bases of transistors 55 and 56 at point 57, provide a means for establishing a differential bias between transistors 55 and 56 which causes transistor 56 to be "preferred" over transistor 55 whenever base drive is supplied to point 57 and the emitter of transistor 56 is taken to a sufficiently low potential. The way this novel arrangement interacts with conventional PBX equipment and comparator 45 will be appreciated from the description of operation below.

OUTGOING CALLS

The operation of the preferred embodiment on an outgoing call for a ground start trunk 15 will now be described. The customer PBX equipment will be conventionally designed to provide a closure across terminal pair 30, indicating an off-hook condition. This corresponds to the grounding of point 29, which grounds point 57 and also indicates that a PBX tip-ring pair has become connected to PBX line 18 and wishes to seize trunk 15. Under an idle condition bias through resistor 77 is usually provided so that the voltage at point 63 is approximately −24 volts and this is provided along line 62 to point 66, which assures that point 49 is kept sufficiently below −12 volts to assure that point 46 is at approximately ground potential. With point 46 approximately at ground, the collector and emitter of transistor 56 are both approximately at ground and thus no current can flow through transistor 56. Therefore, upon closure of contacts pair 30, transistor 55 will draw the base drive from point 57 which will saturate transistor 55, energizing coil 32 and thus effecting a closure of contacts 35 which grounds point 41. The grounding of point 41 grounds central office ring conductor 17, thus signaling the central office in a conventional manner that seizure of trunk 15 is desired.

In a conventional manner, the central office will place a ground on tip conductor 16 to acknowlegde seizure of trunk 15. A grounding of central office tip 16 is provided to point 27 and thus to point 63 and along line 62 to point 66. In a time determined by the time constant of capacitor 52 and resistors 67 and 68 (approximately 200 milliseconds in the preferred embodiment), point 49 rises from approximately −24 volts toward ground. When point 49 becomes greater than −12 volts, the output of comparator 45 goes to approximately −24 volts, forward biasing diode 69. The voltage drop across diode 69 and the saturated output stage of comparator 45 is less than the drops across diode 59 and light-emitting diode 60, and therefore transistor 56 is now enabled to "steal" the base drive from point 57. This causes transistor 56 to saturate, energizing coil 36, and causes transistor 55 to turn off, terminating the ground at point 41 when contacts 35 open.

When current begins flowing in transistor 56, photodiode 43 of optocoupler 40 will drive phototransistor 61. It will readily be appreciated that with an optocoupler 40 with a current gain of greater than one connected as shown in the FIGURE, transistor 56 will be latched on so long as base drive is provided at point 57.

It will therefore be appreciated that the closure across PBX hook switch terminal pair 30 initially causes the ground start relay to close contacts 35, but when comparator 45 swings to a negative output indicating acknowledgement of seizure of trunk 15 by the central office (through the grounding of tip conductor 16), the maintenance of the closure across terminal pair 30 will cause loop relay coil 36 to becomes energized and will shut off ground start relay coil 32. The transition to approximately −24 volts at point 46 also provides current to coil 38 of the supervisory relay which closes contacts 39 thus providing the supervisory signal, i.e., the closure across terminal pair 28. Photodiode 33 is forward biased, and thus illuminated, when coil 36 is excited. Therefore, photodiode 33 provides a visual indication that the loop relay is closed.

The excitation of coil 36 causes contacts 37 to close, completing a loop and allowing current to flow in the central office loop in a conventional manner. Upon the establishment of normal loop current flow when trunk 15 is in use, it will be appreciated that point 27 will conventionally be at approximately −24 volts. Without some other way of maintaining the supervisory signal the return of point 27 to a −24 volt potential would cause the output of comparator 45 to go positive, thus terminating the supervisory signal. However, the inclusion of reed relay 65 in the core of transformer 25 in the preferred embodiment provides a simple and novel way of maintaining the supervisory signals so long as loop current is flowing in trunk 15.

Note that when DC loop current is established in trunk 15, the magnetic field within transformer 25 will close reed delay 65. The closure of this relay grounds line 70 which is connected through resistor 71 to point 49. Therefore, on an outgoing call on a ground start trunk, the present invention provides a supervisory signal at terminal pair 28 which is initially responsive to the grounding of the tip conductor 16, but upon establishment of loop current in the central office trunk the supervisory signal is maintained only in response to the presence of loop current. This is because the voltage present at point 27 would tend to remove the supervisory signal but for the grounding of line 70 through the closure of reed relay 65.

It will therefore be appreciated that two events will terminate the closure of reed relay 65. One event is a disconnect at the central office which terminates the flow of loop current in the central office equipment and thus will open read relay 65, and the other event is the opening of loop relay contacts 37 which also terminates the flow of loop current.

In the event that the user of the PBX hangs up first, the closure will be removed between terminal pair 30 and thus point 29 will become open. This as noted above conventionally corresponds to an on-hook signal condition at terminal pair 30. This event removes base drive from transistor 56, cutting off the transistor and deenergizing loop relay coil 36, which returns loop relay contacts 37 to their position shown in the drawing. Therefore, it will be appreciated that the very simple combination of elements shown in the preferred embodiment provides the proper signals to a ground start central office, reacts in a predetermined sequence to network control signals from the central office, and is responsive to terminate the supervisory signal at terminal pair 28 either when the connection is broken by the central office or upon the PBX line going on-hook as indicated by the removal of the closure at terminal pair 30.

Since optocoupler 40 will keep loop relay coil 36 energized as long as terminal 29 is grounded, the PBX trunk will not sequence a restart until the PBX has actually released the trunk. This fulfills an often overlooked but essential requirement for satisfactory operation of a PBX ground start trunk. The PBX should promptly open terminal pair 30 when termination of the supervisory signal is detected.

It will be appreciated that the differential bias arrangement referred to above between transistors 55 and 56 is instrumental in providing this very simple interface to a ground start trunk central office, together with the novel expedient of maintaining the supervisory signal only in response to the presence of loop current in the central office loop (as detected by reed relay 65) once the supervisory signal is established in response to the ground of central office tip 16.

Another novel feature of the preferred embodiment of the present invention which allows such a simple PBX interface to be used with various types of central office equipment is the easy way in which this embodiment may be converted to interface with loop start trunks.

Consider for a moment that a short circuit is placed across terminal pair 72, thus holding the emitter of transistor 56 to −24 volts. Upon the closure across terminal pair 30 indicating an off-hook condition on the PBX line, transistor 55 may not turn on and transistor 56 becomes saturated, thus closing loop relay contacts 37 when current flows through coil 36. This starts loop current flowing in the central office trunk 15 and will seize the trunk in a conventional manner. The closing of contacts 37 to complete the loop also causes reed relay 65 to close in response to flux within transformer 25 and, as described above, drives the output of comparator 45 to approximately −24 volts, thus providing supervisory signal at terminal pair 28.

It will therefore be appreciated that the simple expedient of shorting the contact pair, i.e. phototransistor 61 of optocoupler 40, converts the preferred embodiment of the present invention into an interface which interfaces PBX equipment with central office having loop start trunk equipment.

INCOMING CALLS

As is known to those skilled in the art, the central office will signal an incoming call on trunk 15 by grounding central office tip conductor 16 and placing a ringing voltage between tip 16 and ring 17.

The grounding of tip 15 causes a grounding of point 27 as described hereinabove which, upon discharge of capacitor 52, cause the output of comparator 45 to go to approximately −24 volts. This event excites coil 38 of the supervisory relay and provides the supervisory signal at terminal pair 28, indicating central office seizure of trunk 15. The equipment on the PBX side of the interface of the present invention should be conventionally designed to prevent any outgoing call from attempting to seize trunk 15 upon which the incoming call is being received.

As described hereinabove, ring detector 21 will provide a signal at a fourth terminal pair (not shown) which in possible conjunction with the before-mentioned supervisory signal, will indicate either to an operator or automated equipment within the PBX that an incoming call is present on line 15. The PBX equipment must be conventionally designed so that when someone or some device within the PBX answers the incoming call, an off-hook signal will be manifested by a closure across terminal pair 30 which grounds point 57.

Because the supervisory comparator has already taken point 56 to approximately −24 volts, the grounding of point 57 will turn on transistor 56 and transistor 55 will remain off due to the differential bias arrangement described hereinabove. This closes loop relay contacts 37, closing the loop for trunk 15, which signals the central office to trip the ring and establishes loop current which in turn closes reed relay 65. When these conditions have been established, termination by either removal of the closure at terminal pair 30 or the opening of the loop at the central office is precisely as described hereinabove. In the event that a loop start trunk is used, the sequence will proceed in precisely the same manner as described above, except that it will make no difference that comparator 45 has its output driven low, since the emitter of transistor 56 is constantly maintained at −24 volts Termination of the ground on central office tip 16 indicating that the calling party has "given up" prior to answering of the incoming call, will terminate ground at point 27 which removes the supervisory signal at terminal pair 38, indicating to the PBX equipment that trunk 15 is available for seizure.

The present arrangement may be used with the central office equipment which biases an idle tip conductor 16 to approximately −25 volts, simply by cutting the strap which appears between point 63 and 76 in the drawings. In this case, no bias is required from the 24 volt supply through resistor 77 to maintain point 61 below −12 volts when central office tip 16 is idle. In most step-by-step offices and in many electronic switching offices among others, the idle tip conductor is open circuit and it is necessary to bias point 63 through resistor 77 in order to prevent supervisory comparator 45 from "thinking" that the trunk has been seized by a low impedence connection to ground at the central office of tip 16.

It will be appreciated that the foregoing description of the preferred embodiment is by way of example and that other embodiments of the present invention within the scope of the claims which appear below are possible.

I claim:

1. In an interface for connecting a central office ground start trunk pair to a private branch exchange including an off-hook terminal pair, the improvement comprising:

a supervision means for initially providing a supervisory signal in response to a ground condition on one conductor of said central office trunk and for continuing to provide said supervisory signal in response to the presence of loop current in said central office trunk;

said supervision means comprising an isolated switch responsive to a voltage present at a particular point, said voltage being controlled by a reed relay responsive to said loop current in said trunk.

2. In an interface for connecting a central office trunk to a private branch exchange including a PBX hook switch terminal pair, said interface comprising a supervisory means for providing a supervisory signal, the improvement comprising:

control means connected to said hook switch terminal pair for operating an isolated ground start switch in the concurrent presence of an off-hook condition at said hook switch terminal pair and the absence of said supervisory signal, for operating an isolated loop switch closing a loop in said trunk in the concurrent presence of said off-hook condition and said supervisory signal; and for preventing another operation of said ground start switch until said off-hook condition at said hook switch terminal pair actually terminates.

3. The improvement as recited in claim 2 wherein said control means comprises a pair of transistor switches arranged to derive base drive current from said hook switch terminal pair, and further comprising:

bias means for establishing a differential bias for a first one of said pair of transistor switches which operates said isolated ground start switch, the other transistor switch of said pair operating said isolated loop switch, said bias being sufficient to turn off said first one of said transistor switches when said other of said pair of transistor switches is conducting.

4. The improvement as recited in claim 3 further comprising a latching means for latching said other of said pair of transistor switches in a conducting state during the presence of said off-hook signal in response to said supervisory signal.

5. The improvement as recited in claim 4 wherein said isolated loop switch includes at least one contact pair for connecting said central office trunk to said PBX tip ring pair; and a loop control port for operating said isolated loop switch; and said latching means comprises a series connection of said loop control port, a control port for a second isolated switch, said other of said pair of transistor switches, and a contact pair from said second isolated switch.

6. In an interface for connecting a central office ground start trunk to a private branch exchange trunk said central office ground start trunk being characterized by means responsive to ground condition on a ring conductor to provide a ground condition on a tip conductor indicating seizure of said trunk, said private branch exchange including a hook switch terminal pair, the improvement comprising in combination:

an isolated ground start switch for grounding said ring conductor;

a loop switch for closing a loop in said trunk;

control means responsive to an off-hook condition at said hook switch terminal pair for conditioning a first switch and a second switch for operation, said first switch being responsive to close said isolated ground start switch when said first switch is operated, and said second switch being responsive to close said loop switch when said second switch is operated;

a voltage comparator including an output connected to a control point, said output providing a low impedance path to ground when said comparator is in an on state;

a comparator input point, the voltage of which controls said output of said comparator, said comparator being responsive to a predetermined on voltage at said comparator input point to provide said on state;

first connecting means between said compartor input point and said trunk for providing said on voltage at said comparator input point in response to said grounding of said tip conductor;

a second connecting means for connecting a current path from said second switch to said control point;

a biasing means connected to said first switch and said second switch for rendering said first switch operational in response to the presence of said off-hook condition when said comparator is not in said on state and for terminating operation of said first switch and initiating operation of said second switch in response to the concurrent presence of said off-hook condition and said comparator being in said on state; and latching means connected to said second switch for maintaining operation of said second switch until termination of said off-hook condition irrespective of said state of said comparator.

7. The improvement of claim 6 further comprising:

current sensing means responsive to the presence of current in said trunk for providing a loop current signal condition; and a third connecting means connecting said comparator input point and said current sensing means for maintaining said on voltage at said comparator input point in response to said loop current signal condition.

* * * * *